United States Patent
Bronstein (10) Patent No.: US 11,639,048 B2
(45) Date of Patent: May 2, 2023

(54) LAMINATED VEHICLE GLAZING HAVING A STIFF INTERLAYER

(71) Applicant: ACR II GLASS AMERICA, INC., Nashville, TN (US)

(72) Inventor: Wladislaw Bronstein, Trier (DE)

(73) Assignee: ACR II GLASS AMERICA INC., Nashville, TN (US)

( * ) Notice: Subject to any disclaimer, the term of this patent is extended or adjusted under 35 U.S.C. 154(b) by 0 days.

(21) Appl. No.: 17/051,484

(22) PCT Filed: May 7, 2019

(86) PCT No.: PCT/JP2019/018300
§ 371 (c)(1),
(2) Date: Oct. 29, 2020

(87) PCT Pub. No.: WO2019/212062
PCT Pub. Date: Nov. 7, 2019

(65) Prior Publication Data
US 2021/0221101 A1    Jul. 22, 2021

Related U.S. Application Data

(60) Provisional application No. 62/666,220, filed on May 3, 2018.

(51) Int. Cl.
*B32B 17/10* (2006.01)
*B32B 3/08* (2006.01)
(Continued)

(52) U.S. Cl.
CPC ............ *B32B 17/1055* (2013.01); *B32B 3/08* (2013.01); *B32B 5/142* (2013.01); *B32B 17/067* (2013.01);
(Continued)

(58) Field of Classification Search
CPC ...... B60J 1/00; B60J 1/001; B60J 1/02; B32B 17/10–1099
See application file for complete search history.

(56) References Cited

U.S. PATENT DOCUMENTS 3,616,122 A * 10/1971 Orcutt ............... B32B 17/10779
156/107
4,704,174 A * 11/1987 Valimont ............ B32B 17/1033
156/289

(Continued)

FOREIGN PATENT DOCUMENTS

CN    105813840 A    7/2016
DE    102014221245 A1 *  4/2016   ........... B32B 17/064
(Continued)

OTHER PUBLICATIONS

Machine translation of DE 102014/017388 A1, obtained from EspaceNet.*
(Continued)

*Primary Examiner* — Z. Jim Yang
(74) *Attorney, Agent, or Firm* — K&L Gates LLP (57) ABSTRACT

Disclosed generally herein is a laminated vehicle glazing including first and second glass sheets and a polymer interlayer interposed therebetween. The interlayer includes a major part and a stiff part adjacent to the major part. The stiff part does not surround the major part, such that the major part is along at least one edge of the laminated vehicle glazing. The stiff part includes at least one layer made of a material that has a higher Young's modulus than that of the material used in the major part. Young's modulus in the thickness direction of the stiff part is higher than that of the major part.

18 Claims, 8 Drawing Sheets

(51) Int. Cl.
*B32B 17/06* (2006.01)
*B32B 5/14* (2006.01)

(52) U.S. Cl.
CPC .. *B32B 17/10036* (2013.01); *B32B 17/10266* (2013.01); *B32B 17/10293* (2013.01); *B32B 17/10366* (2013.01); *B32B 17/10733* (2013.01); *B32B 17/10761* (2013.01); *B32B 2260/021* (2013.01); *B32B 2260/046* (2013.01); *B32B 2262/106* (2013.01); *B32B 2307/54* (2013.01); *B32B 2307/546* (2013.01)

(56) References Cited

U.S. PATENT DOCUMENTS

| | | | | |
|---|---|---|---|---|
| 5,160,780 | A * | 11/1992 | Ono | C03C 27/048 428/447 |
| 5,523,138 | A | 6/1996 | Chinzi | |
| 5,587,236 | A * | 12/1996 | Agrawal | B32B 17/10036 248/467 |
| 6,261,672 | B1 | 7/2001 | de Paoli | B32B 17/10293 156/303.1 |
| 6,313,796 | B1 * | 11/2001 | Potin | B32B 17/10036 343/700 MS |
| 7,553,536 | B1 * | 6/2009 | Naoumenko | B32B 17/10366 428/192 |
| 10,562,274 | B1 * | 2/2020 | Kingman | B32B 17/10036 |
| 2002/0006504 | A1 * | 1/2002 | Rehfeld | B32B 17/1055 428/212 |
| 2005/0195115 | A1 * | 9/2005 | Yegin | H01Q 1/325 343/713 |
| 2006/0005482 | A1 * | 1/2006 | Bennison | B32B 17/10036 52/204.5 |
| 2007/0011962 | A1 * | 1/2007 | Erskine | F41H 5/263 52/204.71 |
| 2008/0280147 | A1 * | 11/2008 | Thiel | B32B 17/10174 428/428 |
| 2009/0148642 | A1 * | 6/2009 | Mauser | B32B 5/024 428/38 |
| 2011/0070415 | A1 * | 3/2011 | Nakamura | B32B 17/10761 428/212 |
| 2011/0169705 | A1 * | 7/2011 | Goldberger | H01Q 1/325 65/102 |
| 2014/0141206 | A1 * | 5/2014 | Gillard | B32B 17/10137 428/174 |
| 2014/0314973 | A1 * | 10/2014 | Desroches | E06B 7/16 428/34 |
| 2014/0318058 | A1 * | 10/2014 | Morgan | E04B 2/90 52/235 |
| 2015/0093539 | A1 * | 4/2015 | Krugmann | B32B 17/10293 428/192 |
| 2015/0151611 | A1 * | 6/2015 | Gansen | H01Q 1/325 428/138 |
| 2016/0257094 | A1 * | 9/2016 | Lestringant | B60J 1/02 |
| 2016/0318284 | A1 | 11/2016 | Cleary et al. | |
| 2016/0361898 | A1 * | 12/2016 | Sadakane | B60J 1/02 |
| 2017/0361594 | A1 * | 12/2017 | Karagiannis | B32B 25/08 |
| 2019/0366691 | A1 * | 12/2019 | Iwamoto | B32B 17/10036 |
| 2019/0389383 | A1 * | 12/2019 | Yajima | B60R 1/04 |
| 2021/0187901 | A1 * | 6/2021 | Lakshmanan | B32B 17/10899 |

FOREIGN PATENT DOCUMENTS

| | | | | |
|---|---|---|---|---|
| DE | 102014017388 A1 * | 5/2016 | | B32B 17/10761 |
| DE | 102014017388 A1 | 5/2016 | | |
| DE | 102015001350 A1 * | 8/2016 | | B32B 17/10036 |
| EP | 3315304 A1 * | 5/2018 | | B32B 17/064 |
| JP | 2008133141 A * | 6/2008 | | B32B 17/10761 |
| WO | 2015/054112 A1 | 4/2015 | | |

OTHER PUBLICATIONS

Machine translation of JP2008/133141 A, obtained from J-PlatPat.*
Original document and machine translation of DE 102014221245 A1.*
Original document and machine translation of DE 102015001350 A1.*
International Search Report and the Written Opinion for International application No. PCT/JP2019/018300, filed May 7, 2019, dated Jul. 24, 2019 by European Patent Office, 9 pages.
Office Action for Chinese Application No. 201980030032.7, filed May 7, 2019, dated Mar. 11, 2022, by China National Intellectual Property Administration, 9 pages.

* cited by examiner

LAMINATED VEHICLE GLAZING HAVING A STIFF INTERLAYER

CROSS REFERENCE TO RELATED APPLICATION

This application is a national stage of PCT International Application No. PCT/JP2019/018300, filed on May 7, 2019, and claims priority to U.S. Provisional Patent Application No. 62/666,220 filed on May 3, 2018, entitled "LIGHT WEIGHT LAMINATED VEHICLE WINDSHIELD HAVING REINFORCED INTERLAYER FOR A MIRROR BASE," the contents of both are incorporated by reference herein in their entireties.

TECHNICAL FIELD

The present disclosure generally relates to a laminated vehicle glazing (e.g., vehicle windshield). More specifically, this disclosure relates to a laminated vehicle windshield having an improved interlayer where a partial area near an accessory attaching to the windshield (e.g., mirror base of a rear-view mirror) is strengthened by a stiffer interlayer material.

BACKGROUND ART

Laminated glass may be used as windows and glazings, for example, in architectural and transportation applications, comprising first and second glass sheets and a polymer interlayer therebetween. Vehicle windshields, for example, are typically a laminated glazing.

In the automotive industry, reduction of vehicle weight is sought to improve fuel efficiency and achieve a reduction of carbon dioxide emission and/or extend the cruising distance of a fully- or semi-electric vehicle. Due to the trend of weight reduction, light-weight laminated vehicle glazings (e.g., laminated windshield) are strongly desired.

One way to reduce the weight of a laminated glazing is to use thinner glass sheets. There is, however, a challenge to maintain mechanical robustness and strength of a light-weight laminate glazing compared with a conventional laminate glazing comprising relatively thicker glass sheets.

US 2016/0318284 A1 generally discloses a light-weight laminated glazing comprising a non-chemically strengthened external glass sheet (first glass sheet) having a thickness ranging from about 1.5 mm to about 3.0 mm and a chemically strengthened internal alkali aluminosilicate glass sheet (second glass sheet) having a thickness equal to or less than 1 mm.

Although chemical strengthening may improve mechanical robustness of thinner glass sheets, it is challenging for economic performance and manufacturing productivity, because chemical strengthening after glass bending requires additional processes and reduces manufacturing yield due to potential changes to the bent shape of the glass sheets. Therefore, it is further desired to provide light-weight laminated glazing comprising non-chemically strengthened glass sheets by maintaining mechanical robustness and strength.

US 2016/0361898 A1 discloses a laminated substrate with a partially reinforced intermediate layer. This intermediate layer has a first major region and a second reinforced peripheral region that is stiffer than the first major region to make the laminated substrate sufficient in both sound insulation property and stiffness.

US 2016/0250825 A1 discloses a glass laminate structure with a partially reinforced intermediate layer. This intermediate layer has a first central region and a second peripheral region surrounding the first central region. The second peripheral region is stiffer than the first central region to make the glass laminate structure have an improved edge strength.

SUMMARY

Technical Problem

US 2016/0361898 A1 discloses an intermediate layer in which the first major region is formed of a thermoplastic resin, and the second reinforced peripheral region is formed of a high shear modulus body without adhesiveness and an adhesive layer formed thereon. Forming this adhesive layer, however, requires additional processes to produce the laminated substrate.

US 2016/0250825 A1 discloses thermosetting polymeric materials for the second peripheral region. These thermosetting polymeric materials may be inferior in adhesion to the glass substrates, due to their increased stiffness to have an elastic modulus that is greater than that of the first central region.

It is therefore at least one object of the present disclosure to provide a laminated vehicle glazing with an interlayer having a stiffer part that has a good balance between adhesion to the glass sheets and stiffness such that even a light-weight laminated vehicle glazing is maintained in mechanical robustness and strength.

Solution to Problem

According to the present disclosure, provided, among other embodiments, is a laminated vehicle glazing, comprising:

a first glass sheet having a S1 surface facing a vehicle exterior and a S2 surface opposite the S1 surface;

a second glass sheet having a S4 surface facing a vehicle interior and a S3 surface opposite the S4 surface; and an interlayer facing the S2 and S3 surfaces;

wherein the interlayer is positioned between the first and second glass sheets;

wherein the interlayer comprises a major part and a stiff part adjacent to the major part, wherein the major part is along at least one edge of the laminated vehicle glazing, wherein the major part comprises at least one layer made of a first interlayer material, and the stiff part comprises at least one layer made of a second interlayer material, wherein the second interlayer material has a higher Young's modulus than the first interlayer material, and wherein at least one of the first and second glass sheet has a thickness equal to or less than 2 mm.

Advantageous Effects of Invention

According to the present disclosure, a laminated glazing interlayer has a stiff part which has a good balance between adhesion to glass and material stiffness, such that it is possible to maintain mechanical robustness and strength of the laminated vehicle glazing. The stiff part may be positioned in an area corresponding to an attachment such that the stiff area may prevent breakage of the laminated vehicle glazing at the attachment.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

FIG. 1(*a*) illustrates a conventional laminated vehicle glazing (e.g., windshield) with an accessory (e.g., a rear-view mirror) as viewed from S4;

FIG. 1(*b*) illustrates a conventional laminated vehicle glazing having a mirror base attached thereto (a cross-section along line AA' shown in FIG. 1(*a*));

FIG. 1(*c*) illustrates a conventional laminated vehicle glazing having a rear-view mirror (a cross-section along line AA' shown in FIG. 1 (*a*));

FIG. 2(*a*) illustrates a cross-section view of a laminated vehicle glazing having a mirror base, according to an exemplary aspect of the present disclosure;

FIG. 2(*b*) illustrates a cross-sectional view of a laminated vehicle glazing having a rear-view mirror, according to an exemplary aspect of the present disclosure;

DETAILED DESCRIPTION

In the following description, for purposes of explanation, specific details are set forth to promote a thorough understanding of one or more aspects of the disclosure. It may be evident in some or all instances, however, that many aspects described below can be practiced without adopting the specific design details described below.

Moreover, for purposes of this disclosure, including with reference to the figures, a S1 surface of a first glass sheet ("exterior glass") faces a vehicle exterior and a S4 surface of a second glass sheet ("interior glass") faces a vehicle interior. The first glass sheet has a S2 surface opposite the S1 surface, and the second glass sheet has a S3 surface opposite the S4 surface, such that in a laminated glazing, S2 and S3 surfaces face each other. An interlayer laminated between the first and second glass sheets may face the S2 and S3 surfaces.

This disclosure is directed to a laminated vehicle glazing having an improved interlayer where an area of the interlayer near an attachment is strengthened by an adhesive material stiffer than the portion of the interlayer that is not strengthened, or the major part of the interlayer. An attachment may, for example, be an accessory, such as a handle; an attachment which may be connected to an accessory, such as a mirror base or a bracket for a camera, sensor and the like; or a locating pin. As disclosed herein, the attachment may be a component attached to at least one main surface of the laminated vehicle glazing. It may be preferable that the attachment is attached to the S1 or S4 surface, depending on the attachment function.

An improved interlayer, as disclosed herein, may include an interlayer facing the S2 and S3 surfaces, wherein the interlayer includes a major part facing the S2 and S3 surfaces and, adjacent to the major part, a stiff part facing the S2 and S3 surfaces, wherein the major part is along at least one edge of the laminated glazing. In certain embodiments, the stiff part of the interlayer may be surrounded by the major part. The major part may include at least one layer made of a first polymer material, and the stiff part may include any suitable second adhesive material, wherein the second adhesive material has a higher Young's modulus than the first polymer interlayer material. As disclosed herein, the Young's modulus may be measured in accordance with ASTM D 4065-12, "Standard Practice for Plastic: Dynamic Mechanical Properties" or ASTM D638-14 "Standard Test Method for Tensile Properties of Plastics". Values of Young's modulus measured at a 10 second load duration and 20 deg. C. are employed herein.

An interlayer with a high Young's modulus may have less adhesion to the glass sheet compared to an interlayer with low Young's modulus. This phenomenon may be observed at temperatures as low as −15 deg. C. to −25 deg. C. Less adhesion may increase the risk of interfacial peeling between the interlayer and the glass sheet(s), particularly in a peripheral portion of the glazing. As the major part may be along at least one edge of the laminated vehicle glazing in this disclosure, the risk of peeling may be reduced. Further, in some embodiments, the major part may extend at least partially along each edge of the laminated vehicle glazing, and in certain embodiments, the major part may surround a stiff part in the laminated glazing.

Further, an attachment on a glazing may provide stress to the glazing at the attachment. Thus, preferably, the attachment may be located at a stiff part of the glazing to improve mechanical robustness and strength of the glazing. In further embodiments, an area of the stiff part facing the attachment may be larger than surface area of an adhered surface of the attachment, wherein the adhered surface is adhered to the glazing.

Figure 1A:
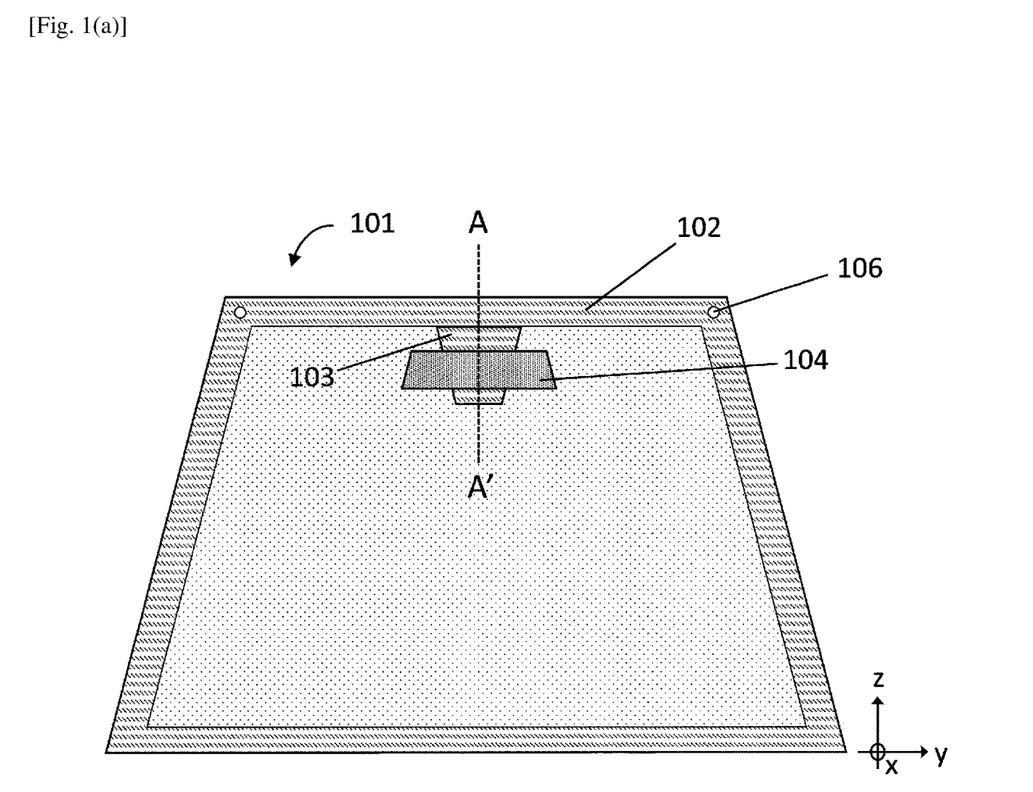
Figure 1B:
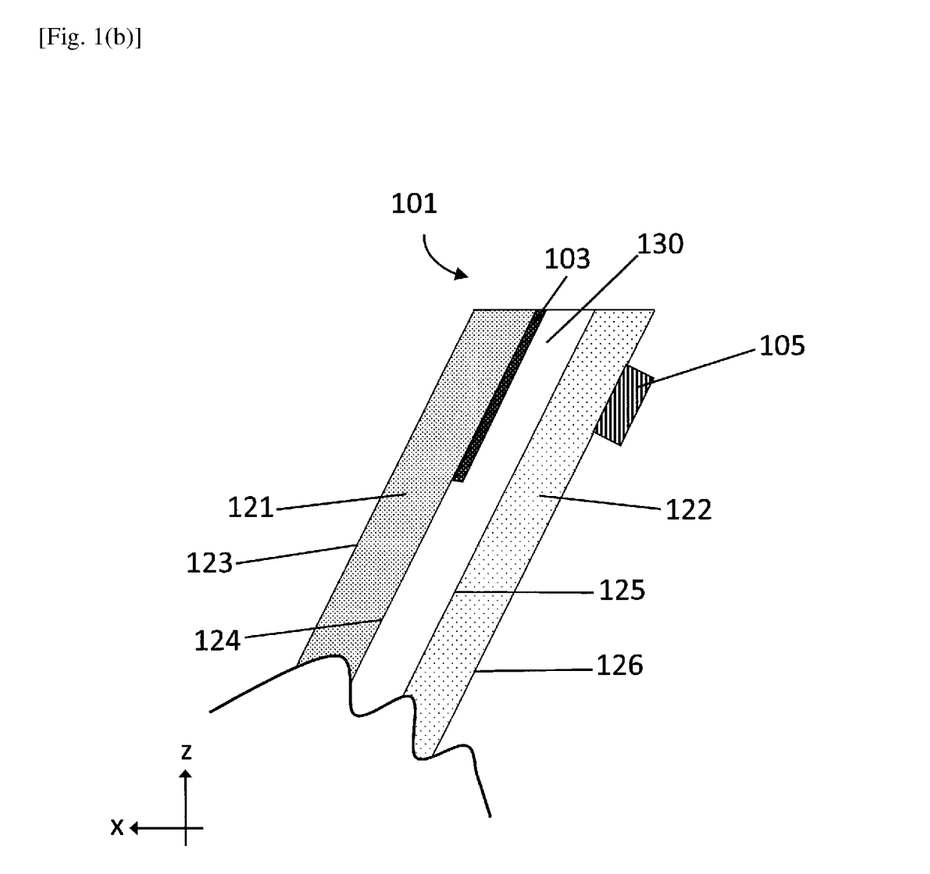
Figure 1C:
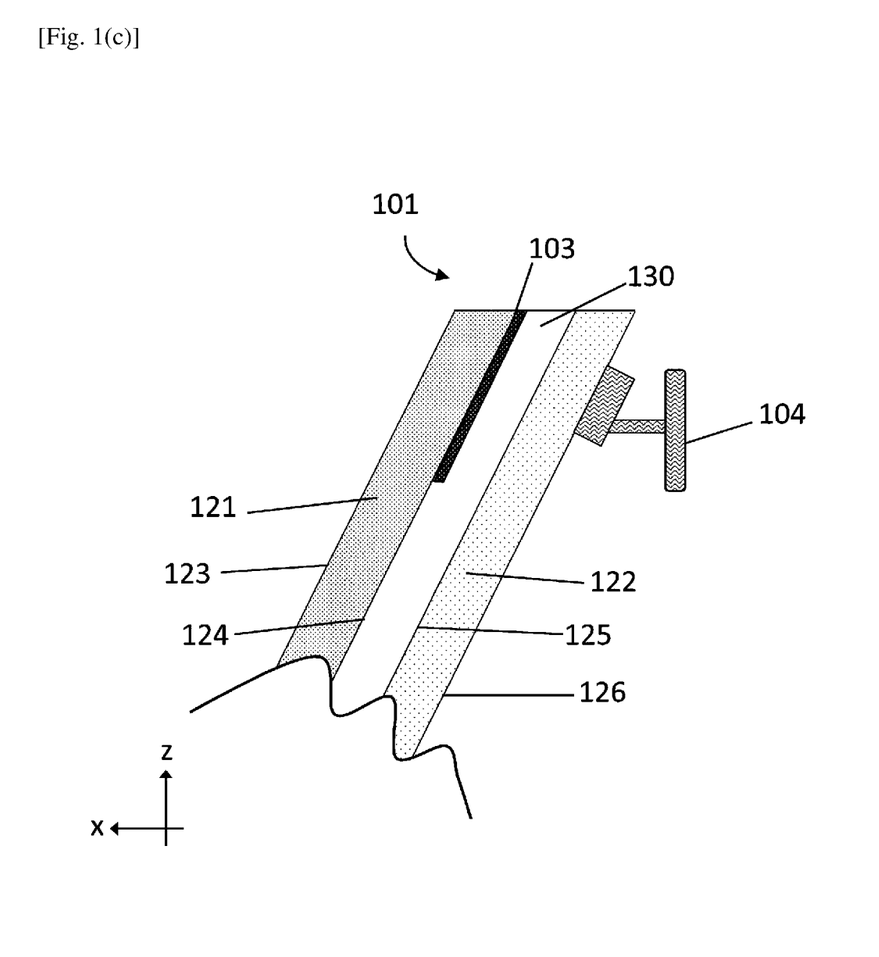

FIG. 1(*a*) shows a conventional laminated vehicle glazing (i.e., a windshield) 101 from a S4 surface 126, and FIGS. 1(*b*) and 1(*c*) show a cross-sectional view of the glazing 101 along line AA'.

A conventional laminated glazing 101 may include a first glass sheet 121 with S1 123 and S2 124 surfaces and a second glass sheet 122 with S3 125 and S4 126 surfaces, which may be laminated with a conventional polymer interlayer 130. A conventional polymer interlayer 130 may include a polymer sheet, which may be a conventional monolayer polymer sheet, a conventional tri-sublayer acoustic polymer sheet or a conventional wedge-shaped polymer sheet. The polymer interlayer 130 may include, for example, polyvinyl butyral (PVB), ethylene vinyl acetate (EVA), polyvinyl acetate (PVA), ionomer, or polyethylene terephthalate (PET). Conventional first and second glass sheet thicknesses typically may be equal to or greater than 1.6 mm. Opaque printed regions 102 and/or 103 may be provided in a periphery of the laminated glazing (e.g. windshield) and/or in an area near a rear-view mirror base 105 or other attachments (not shown in FIG. 1 (*a*)).

Attachments may interact with the glass, including adherence thereto. Such attachments, may include any suitable attachment known in the art, including rear view mirrors 104; brackets for holding accessories, including sensors; holding mechanisms; handles; and placement pins 106. Where the attachment is a rear-view mirror 104, the attachment may be attached to the S4 surface 126 of an interior second glass sheet 122 via a mirror base 105 (also known as a button, mount, or knob).

In the automotive industry, mechanical robustness of laminated windshields may be regulated. For example, the Economic Commission for Europe Regulation 43 (ECE R43) presents standards for mechanical robustness and strength measured by a headform test (Annexes 3 and 6 in the ECE R43) and ball-impact test (Annexes 3 and 6 in the ECE R43), with which laminated windshields may be in compliance in the European Union. In addition to satisfaction of regulation ECE R43, laminated windshields may also satisfy an additional requirement for mechanical strength of an attachment, including an attachment of an accessory depending on a specification of vehicle manufacturers. For example, in-plane and out-of-plane torque tests (as described herein with reference to FIG. 3) measuring mechanical robustness and strength may be required.

Present inventors investigated mechanical robustness and strength by performing headform tests, ball impact tests, in-plane toque tests and out-of-plane torque tests, for laminated glazings comprising at least one relatively thinner glass sheet (without chemical strengthening). Particularly, the thinner glass sheet was less than 2 mm in thickness, including 1.1 mm, 0.7 mm, and 0.55 mm. Surprisingly, the inventors found no relationship among the mechanical robustness measured by these four tests, and that the out-of-plane torque requirement for an attachment may be most challenging to pass with at least one thin glass sheet. An out-of-plane torque test for laminated glazings such as windshields, door windows, back window and sliding door window may be an important criterion and relevant to daily application. For example, forces may be applied to an attachment in the manual position adjustment of a rear-view mirror 104, an accidental hit and/or high internal loads on bumpy roads.

For example, testing of laminated glazing constructions having a first glass sheet 2.1 mm in thickness, a second glass sheet 1.1 mm or 0.7 mm or 0.55 mm in thickness and a conventional polyvinyl butyral (PVB) polymer interlayer, resulted in passing only the headform test, ball impact test and in-plane torque test, and not passing the out-of-plane torque test for a mirror base. It has been also found that an origin of the failure mode (glass breakage) during out-of-plane torque testing for a mirror base 105 may be on or inside the thinner glass sheet. It can be understood that there is a need to improve out-of-plane torque mechanical robustness in light weight laminated glazings.

The present disclosure provides, among other features, a laminated vehicle glazing with an improved mechanical robustness for an attachment, which may include an accessory or other attachment, according to an exemplary aspect of the present disclosure. In some embodiments, it may be preferable that an attachment and glazing pass an out-of-plane torque test at at least 30 Nm (Newton·meter), more preferably at least 35 Nm.

Figure 2A:
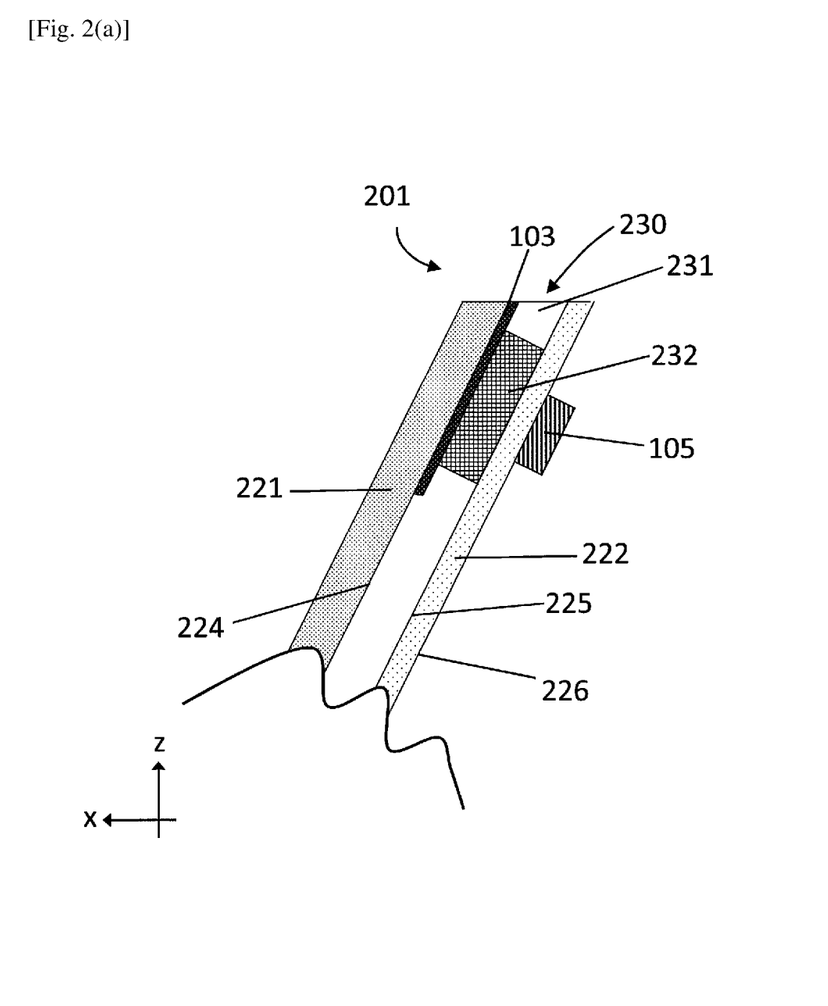
Figure 2B:
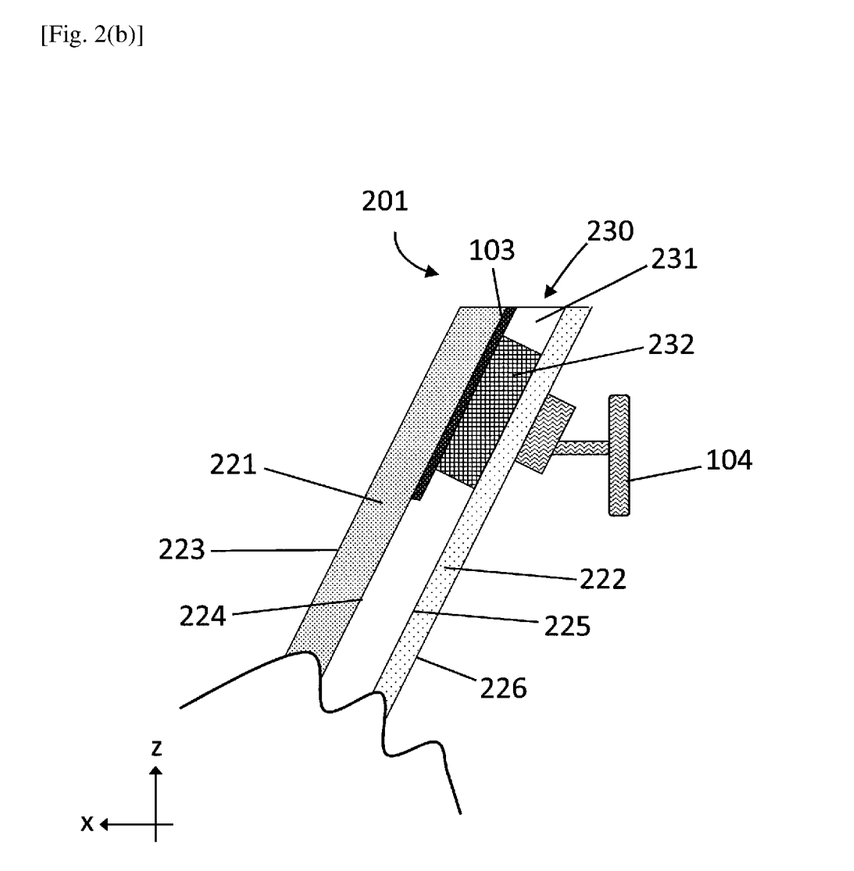

FIGS. 2(a) and 2(b) show a cross-sectional view of an exemplary embodiment of a laminated vehicle glazing 201 with an improved polymer interlayer 230 having at least one stiff part 232. As illustrated, an attachment, such as a mirror base 105, may be made over the stiff part 232 of the interlayer 230.

Preparation of a laminated glazing may include fully or partially bending a first glass sheet 221 and a second glass sheet 222 to fit a vehicle window design. In some embodiments, soda-lime glass or aluminosilicate glasses manufactured by a float method or fusion method may be used. Any color, including clear, green, tinted or privacy, glass may be used. It may be preferable that the thickness of the second glass sheet 222 may be equal to or less than the thickness of the first glass sheet 221. The thinner glass sheet as disclosed herein, may be any suitable thickness. The thickness of the second glass sheet 222 may be less than or equal to 2.0 mm, preferably less than or equal to 1.6 mm, more preferably less than or equal to 1.1 mm, and even more preferably less than or equal to 0.7 mm. In some further embodiments, the thin glass sheet may have a thickness equal to or less than 0.55 mm. In certain embodiments, the second glass sheet may be non-chemically strengthened glass. Optionally, a functional coating such as infrared ray reflecting (IRR) coating, which may include functional metallic silver layers, may be deposited on the S2 224 or S3 225 surface.

In some embodiments, opaque printing regions 102 and/or 103 may be provided on S2 224, S3 225, or S4 226 surfaces or combinations thereof, at the periphery of the windshield 201 and/or in an area near an attachment, including an accessory attachment. For example, an opaque printing region 103 may be provided at and around the attachment of a rear-view mirror base 105. A peripheral opaque printed region 102 is not shown in FIG. 2. In some embodiments, a shade band may be provided in a major part of a polymer interlayer.

In certain embodiments, the attachment may be a mirror base 105 for attaching a rear-view mirror 104 to a windshield 201. Particularly, a rear-view mirror 104 may be attached to the S4 surface 226 via a mirror base 105. The attachment may be attached via any suitable adhesive source, in any suitable form. For example, the adhesive source may include structural bonding tapes formulated for bonding plastic or metal materials to inorganic glasses, such as those made by 3M: 9214, 9263 or 9270. The preferable adhesive source may depend on the attachment to be adhered. The attachment may include various materials such as metals and/or polymers which may be better suited to a particular adhesive. Further, the area of the adhesive may depend on the size and/or configuration of the attachment. The size of the adherence may affect the force required in an out-of-plane torque test as a broader area of adherence may disperse stress over a larger area in the glass, which may increase the force required to break the glass. Thus, the necessary Young's modulus of the stiff part 232 may be higher where an attachment is small and force is dispersed over the smaller attachment.

A polymer interlayer 230 with a strengthened part may include a major part 231 and a stiff part 232. The major part 231 may be a conventional polymer interlayer material known in the art, such as PVB, ethylene vinyl acetate (EVA), polyvinyl acetate (PVA), ionomer, or polyethylene terephthalate (PET). In some embodiments, the major part 231 may be monolayer, multilayer (such as for acoustic applications), or have a wedge angle(s). Optionally colored pigments/dyes or other functional particles such as infrared absorbing particles or ultraviolet absorbing particles may be dispersed in the polymer interlayer 230. The thickness of the polymer interlayer 230 may be properly chosen. For example, without limitation, a typical interlayer thickness may be in the range of about 0.70 to about 0.90 mm such as 0.76 mm, 0.78 mm and 0.81 mm. Preferably the stiff part 232 has a thickness substantially matching that of adjacent major part 231 interlayer.

The stiff part 232 may be a stiffer (i.e., having higher Young's Modulus) material than the major part 231, and provide enough adhesion between the stiff part 232 and the glass sheets 221, 222 and the major part 231. It may also be preferable that the stiff part 232 material is mechanically and chemically stable and robust during lamination and in practical application. Further, it is preferable that the stiff part 232 material is compatible with the major part 231, including having adhesion between the materials. The increased stiffness of the stiff part 232 may depend on various factors, thus the difference in stiffness between the major part 231 and the stiff part 232 may vary. The desired stiffness of the stiff part 232 may, for example, depend on the shape and size of adhesion between the glass and the attachment. Further, the shape and size of an attachment or accessory may affect the type of force applied thereto and the necessary increased stiffness.

The stiff part 232 may be any suitable material, particularly any suitable adhesive. For example, the stiff part 232 may be an adhesive sheet, a paste, or a resin. Such suitable stiff part 232 material may include, for example, carbon fiber reinforced plastic (CFRP). Further embodiments may include a stiff part 232 which is more or less stiff than the CFRP, including high stiffness PVB or polycarbonate (PC). Further embodiments of a stiff part 232 may include reinforcement other than carbon fibers, including, for example, polymer or glass fibers. The stiff part 232 may be formed by any suitable adhesive having a higher stiffness than a major part 231. The major part 231 may be formed of a conventional interlayer as disclosed herein, including an interlayer having a wedged angle or a tri-layer acoustic damping interlayer. Preferably the major part 231 is formed by an interlayer having a Young's modulus of about 0.1-0.2 GPa. Where the major part 231 comprises multiple layers (such as two skin layers and one soft core layer), the Young's modulus of the multilayered major part 231 may be used, rather than a Young's modulus of an individual layer. In some embodiments, the stiff part 232 is formed of a material having a Young's modulus of at least about 0.6 GPa, preferably at least about 1.0 GPa, more preferably at least about 20 GPa, and even more preferably at least about 50 GPa. A glazing may preferably have at least one stiff part 232 but may include additional stiff parts for additional attachments. Further, the stiff part 232 material may be clear or colored. In some embodiments, sensors may collect information through an area of the stiff part 232, and it may be preferable in such embodiments to provide a clear stiff part 232.

In further embodiments, a stiff part 232 material may a material or a combination of materials which may be curable. For example, the stiff part 232 material may be cured by ultraviolet light, heat, or photochemical reaction. The stiffness of the stiff part 232 material may increase upon curing and may be more pliable or less stiff prior to curing.

Further, according to another aspect of the present disclosure, a suitable material for a stiff part 232 having high stiffness may be selected based on the thickness of a glass sheet to which an attachment is to be made. Particularly the material for a stiff part 232 may be selected to provide sufficient stiffness of the laminated glazing at the stiff part 232. Particularly, a ring-on-ring deflection test, as described herein, may be used to determine the possible deflection of a glazing and inform the lamination stiffness. The stiffness of the interlayer material used for a stiff part 232 may depend on a glass thickness. For example, in some embodiments, a thinner glass sheet may be laminated having a stiff part 232 interlayer which is stiffer than a stiff part 232 interlayer in a laminate having a thicker glass sheet.

Figure 5:
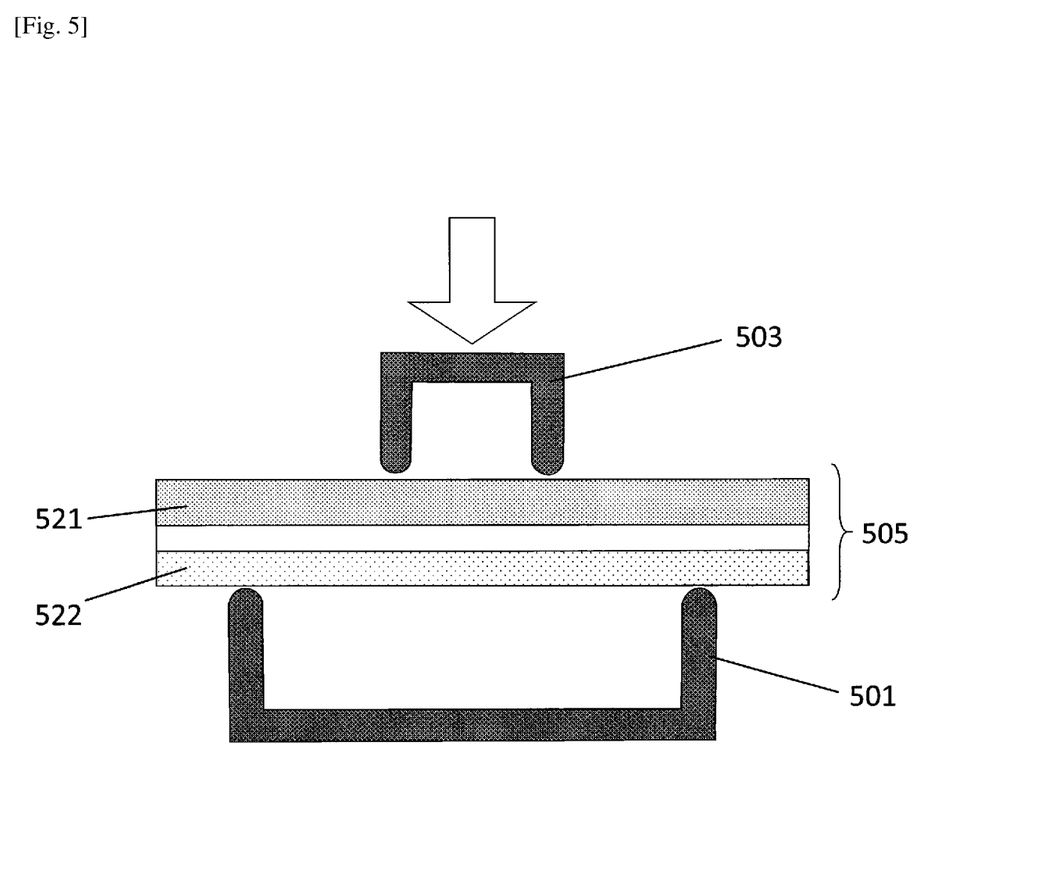
FIG. 5 illustrates a schematic cross-sectional image of a ring-on-ring deflection test.

A ring-on-ring deflection test is basically based on ISO 1288-5:2016, "Glass in Building—Determination of the bending strength of glass, Part 5: Coaxial double ring test on flat specimens with small test surface areas", except as to the experimental conditions specifically described herein. A schematic cross-sectional image of the test is shown in FIG. 5. A supporting ring 501 and a loading ring 503 may be concentric cylindrical shaped jigs having different diameters. A specimen 505 is sandwiched between the supporting ring 501 and the loading ring 503 and a load is applied by a load cell above the loading ring 503, bending the specimen 505. The contact parts of the rings 501, 503 which come into contact with the specimen 505 may be round with predetermined radiuses of curvature.

A ring-on-ring deflection test may include:

Step 1: With a ring-on-ring bending test, measure the bending deflection of a referential glass construction comprising a first flat sample glass sheet, second flat sample glass sheet and a conventional automotive polymer PVB interlayer (for example, S-LEC Clear film of Sekisui Chemical Co. Ltd or Saflex RB41 of Eastman Chemical Company), wherein the first flat sample glass sheet and second flat sample glass sheet have substantially the same thickness. For example, the glass sheets may have a thickness of 2.1 mm, 1.8 mm, 1.6 mm, or 1.4 mm. The referential laminated glass specimen for the ring-on-ring test may be 300 mm×300 mm. A supporting ring 501 with a diameter of 150 mm and a contact point radius of curvature of 2.5 mm and a loading ring 503 with a diameter of 50 mm and a contact point radius of curvature of 2.5 mm may be used. Center points of the specimen, supporting 501 ring and loading ring 503 are aligned. The bending deflection (i.e. displacement of a load cell) is measured with a loading rate of 1 mm/min until an external load (force) of at least 500 Newton (N) at 22-23 deg. C. and at the relative humidity level of 30-50% is reached. The deflection at the external load 500 N for the referential glass construction is a referential value.

Step 2: With a ring-on-ring bending test, measure the bending deflection of a laminated glazing 505 to be tested, wherein the laminated glazing specimen 505 comprises a third flat sample glass sheet 521 having a substantially same thickness as the first and second flat sample glass sheets of the referential glass construction, a fourth flat glass sheet 522 and interlayer material(s) having a higher Young's modulus than the conventional PVB used in step 1. The fourth flat sample glass sheet 522 may have a thickness which is equal to or thinner than the third flat sample glass sheet 521, and the stiffer interlayer material(s) may be used over the entire laminated sample. Values of bending deflection are measured as described in step 1 wherein an external load (force) is applied to a S1 surface of the third flat sample glass sheet 521. The deflection at an external load of 500 N is measured to provide a measured value.

Step 3: Calculate a normalized deflection value by dividing the measured value by the referential value. A suitable material for a stiff part 232 with a specific thickness combination of the first and second glass sheets may provide a normalized deflection value equal to or less than 1.4, preferably equal to or less than 1.2, more preferably equal to or less than 1, and even more preferably equal to or less than 0.95. In some embodiments, the absolute value of the deflection of the tested sample may be equal to or less than 0.90 mm, preferably equal to or less than 0.85 mm, or more preferably equal to or less than 0.80. Such a laminated glazing may have enough stiffness near an accessory and provide improved out-of-plane torque strength.

Moreover, the area of the stiff part 232 may be preferably larger than that of the attachment, such as a mirror base 105, to prevent deformation of the laminated windshields under out-of-plane torque forces such that the external load may be distributed across a larger area or distributed from the relatively thinner second glass sheet 222 to the relatively thicker first glass sheet 221. The area of the stiff part 232 may depend on the strength of the material used in the stiff part 232, as a smaller area may be needed where a stiffer stiff part 232 is used and the force distribution may be effective in a small area. In certain embodiments, it may be preferable that the attachment is made closer to the center of the stiff part 232 than to an edge of the stiff part 232 to distribute the forces around the stiff part 232 and limit the necessary size of the stiff part 232. For example, it may be preferable that the center of an adhered surface of the attachment is closer to the center of the stiff part 232 than to an edge of the stiff part 232. In some embodiments, a stiff part 232 may include more than one attachment, such that the stiff part 232 is large enough that multiple attachments may be attached over the stiff part 232. The shape of the stiff part 232 may be the same or different from an attachment, and may include any shape, such as a circle, rectangle, ring, etc.

Attachments to a glazing may include any suitable attachment. This may include accessories or attachments for accessories. For example, a mirror base is an attachment which an accessory (a rear-view mirror) may be attached to. Further attachments or accessories may include placement pins, sensor brackets, or handles.

The location of a stiff part 232 in the glazing 201 may depend on the type of attachment to be adhered to a glazing. For example, where the attachment is a mirror base or other attachments to be placed near an edge of the glazing, the stiff part 232 may be closer to a first peripheral edge of the interlayer than to a second peripheral edge, within a central region connecting the first and second opposing peripheral edges.

EXAMPLES

Examples and experimental results are explained herein. In the following description, for the purposes of explanation and not limitation, examples with specific details are set forth to provide a thorough understanding of the present disclosure. However, it will be apparent to those having ordinary skill in the art that other embodiments with various modifications and variations may be practiced without departing from the spirit and scope of the present disclosure.

Examples A-1, A-2, and A-3 in Table 1 show exemplary (flat) laminated glass specimens having 200 mm×150 mm dimension for an out-of-plane torque test which measures mechanical robustness and strength of a mirror base attached to the second (interior) glass sheet. The laminated glass specimens were prepared by a known lamination process for a laminated vehicle glazing: de-airing using bag in a temperature range from 100 to 120 deg. C. and autoclaving in a temperature range from 120 to 160 deg. C. with a pressure of 10 to 14 bar.

Soda-lime glass sheets, defined by ISO 16293-1:2008, made from a float process were used for the first and second flat glass sheets. The first (exterior) glass sheet had 2.1 mm thickness, and the second (interior) glass sheet had 1.1, 0.7, or 0.55 mm thickness. A known conventional automotive PVB polymer interlayer having 0.76 mm thickness was used for the major part 231. Carbon fiber reinforced plastic (CFRP) interlayers with Young's modulus of about 70 GPa were used for the stiff part 232 near a mirror base. Particularly, the CFRP interlayer used in these examples included epoxy prepreg reinforced by carbon fibers with 55-60% carbon fiber by volume, which may be available as CE 8208-200-42, CE 8201-200-45 and CE 8204-410-42S of Carbon-Werke Weissgerber GmbH. The PVB polymer interlayer was replaced by the CFRP interlayer in a patched area larger than that of a mirror base, and the mirror base adhered to a center of the second glass sheet over the patched area.

Further examples Y-1, Y-2 and Y-3 in Table 1 were prepared in the same way as examples A-1, A-2 and A-3, except that a higher stiffness PVB polymer interlayer (particularly, DG 41 from Eastman Chemical) was used for the stiff part rather than CFRP interlayer.

Comparative examples X-1, X-2 and X-3 in Table 1 were prepared in the same way for Examples A-1, A-2 and A-3, except that no stiff part in the major PVB polymer was provided.

Figure 3:
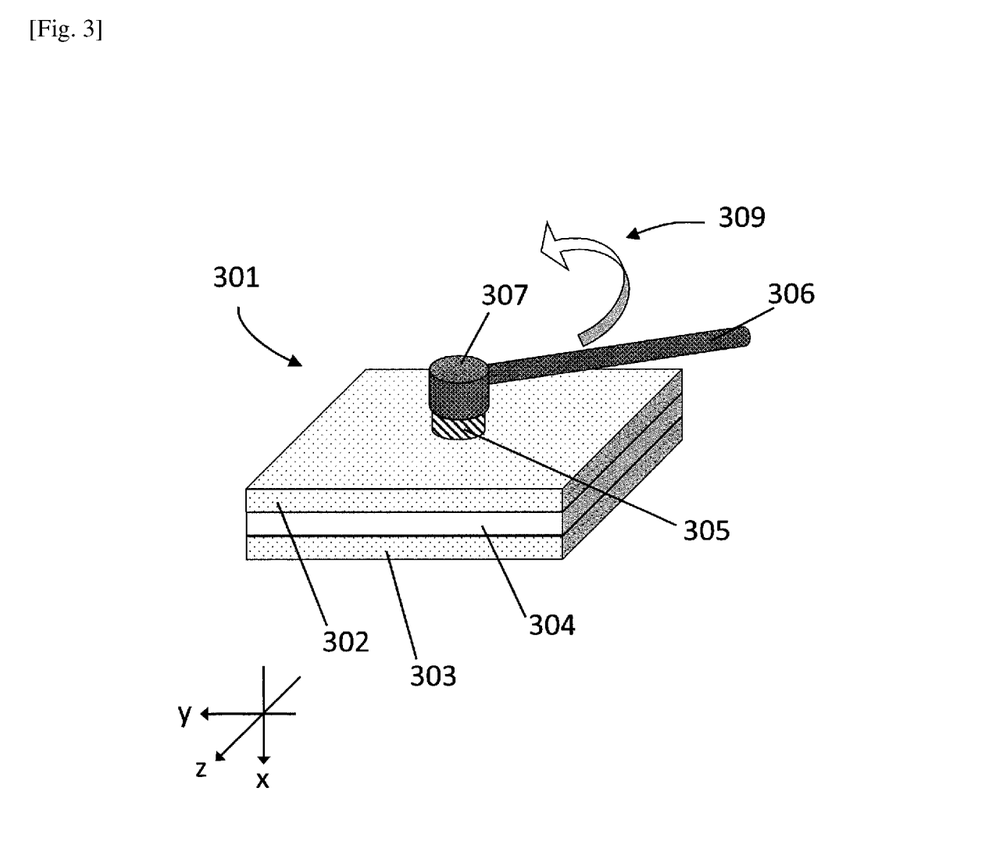
FIG. 3 illustrates an experimental set-up and a laminated glass specimen for a torque measurement (out-of-plane torque) in a mirror base breakage test.

FIG. 3 illustrates an experimental set-up of a laminated glass specimen 301 for a torque measurement in a mirror base breakage test. The test specimens 301 were formed of an exterior glass sheet 303, an interlayer 304, and an interior glass sheet 302. The test specimens 301 were fixed with clamps to immobilize the specimens 301 during testing (the clamps are not shown in FIG. 3). A torque wrench 306 was attached to the mirror base 305 via a universal joint 307 (called Cardan joint). Out-of-plane torque force to a direction 309 shown in FIG. 3 was applied by moving the torque wrench 306 in the out-of-plane 309 direction. Out-of-plane torque values were recorded when the test specimens 301 were broken during the test. Averaged breakage torque values over 2-6 specimens, depending on the specimen construction, were calculated.

The results are shown in Table 1. The average breakage (out-of-plane) torque values of examples A-1, A-2, and A-3 were significantly improved compared to those of the comparative example X series. Thus, examples A-1, A-2, and A-3 may pass the mechanical robustness requirement of the out-of-plane torque test. Good adhesion of the stiff part to the glass sheet and a high Young's modulus may allow distribution of the applied out-of-plane torque to a larger area and may provide enough support against breakage during torque testing.

The example Y series showed failure between the glass and the interlayer, indicating a problem during the lamination process. As there was a failure of adhesion between the glass and the interlayer due to the lamination process, the stiff interlayer is considered in the example B series discussed herein. In view of the example B series, it may be understood that a higher stiffness PVB polymer for the stiff part 232 may improve a mechanical robustness and a strength of the laminated vehicle glazing. Thus, in some embodiments, the higher stiffness PVB polymer may provide enough additional strength over a conventional PVB. Particularly, the size of the attachment, such as a mirror base, and the size of the stiff part 232 of higher stiffness PVB may determine whether the higher stiffness PVB has sufficient stiffness to provide additional strength to a glazing for an attachment thereto as shown in the example B series.

Contrary to the example A and Y series, comparative examples X-1, X-2 and X-3 show that a relatively thinner second (interior) glass sheet may reduce stiffness of the laminated glass construction having a conventional PVB polymer interlayer. As a result, when the out-of-plane torque is applied, these comparative examples may experience a relatively large deformation. The conventional PVB interlayer without a stiff part 232 may not provide enough support to the thinner glass sheet to resist the out-of-plane torque, resulting in a lower breakage torque, compared to the example A and Y series.

TABLE 1

| "Out-of-Plane" Torque Measurement | First Glass (Exterior) (mm) | Second Glass (Interior) (mm) | Interlayer Material Major Part | Interlayer Material Stiff Part Near a Mirror Base | | Breakage Torque (N · m) | Origin of Breakage |
|---|---|---|---|---|---|---|---|
| Example A-1 | 2.1 | 1.1 | Conventional PVB Polymer Interlayer | Carbon Fiber Reinforced Plastic (CFRP) Interlayer | Youngs Modulus About 70 GPa | 33.6 | Inside interlayer or outside of the stiff part (no glass breakage) |
| Example A-2 | 2.1 | 0.7 | | | | 31.0 | |
| Example A-3 | 2.1 | 0.55 | | | | 33.7 | |
| Example Y-1 | 2.1 | 1.1 | | Higher Stiffness PVB Polymer Interlayer | Youngs Modulus About 0.7-1.2 GPa | 19.4 | Separation between the glass and stiff part of the interlayer |
| Example Y-2 | 2.1 | 0.7 | | | | 17.2 | |
| Example Y-3 | 2.1 | 0.55 | | | | 17.8 | |
| Comparative Example X-1 | 2.1 | 1.1 | | No Stiff Part | Youngs Modulus About 0.1-0.2 GPa for Conventional PVB | 16.2 | Second glass under the mirror base |
| Comparative Example X-2 | 2.1 | 0.7 | | | | 14.7 | |
| Comparative Example X-3 | 2.1 | 0.55 | | | | 13.8 | |

Examples B-1 and B2, as provided in Table 2, were formed by laminating flat glass substrates with a higher stiffness PVB (particularly, DG41 available from Eastman Chemical) having a Young's modulus of about 0.7 to about 1.2 GPa. Example B-1 was formed having a 2.1 mm thick first soda-lime glass sheet and a 1.1 mm second soda-lime glass sheet and was a laminated construction 304.8 mm (12 inches) square. Example B-2 was formed as a 304.8 mm (12 inches) square laminate having a 2.1 mm first soda-lime glass sheet and a 0.55 mm second soda-lime glass sheet. The lamination processes for preparing example B series were the same as those used for the example A, Y, and X series. The higher stiffness PVB was used over the entire laminate area, and a mirror base was applied to the center of the laminate. The out-of-plane torques testing was performed by the same method as in the example A, Y, and X series. The area of a stiff part 232 may affect results of an out-of-plane torque test. The example B series included samples having an entire area of higher stiffness PVB, which may pass mechanical robustness tests, including the out-of-plane torque test. A larger stiff area may distribute forces applied thereto, increasing the force required to cause breakage. A larger adhesive attachment area may further improve force distribution.

Comparative examples Z-1 and Z-2 were formed in the same manner as examples B-1 and B-2, respectively, except that a conventional PVB interlayer was used across the entire laminates. The conventional PVB used had a Young's modulus of about 0.1 to about 0.2 GPa. The comparative examples Z-1 and Z-2 showed lower force necessary to cause breakage in the out-of-plane torque test than the example B series, and the higher stiffness interlayer provided additional strength to the laminate.

TABLE 2

| "Out-of-Plane" Torque Measurement | First Glass (Exterior) (mm) | Second Glass (Interior) (mm) | Interlayer Material Major Part | Interlayer Material Stiff Part Near a Mirror Base | | Breakage Torque (N · m) | Origin of Breakage |
|---|---|---|---|---|---|---|---|
| Example B-1 | 2.1 | 1.1 | Conventional PVB Polymer Interlayer | Higher Stiffness PVB Polymer Interlayer | Youngs Modulus About 0.7-1.2 GPa | 43.7 | Interior Glass Breakage |
| Example B-2 | 2.1 | 0.55 | | | | 33.1 | Cohesion of Adhesive Between Attachment and Glass |
| Comparative Example Z-1 | 2.1 | 1.1 | | No Stiff Part | Youngs Modulus About 0.1-0.2 GPa for conventional PVB | 31.3 | Interior Glass Breakage |
| Comparative Example Z-2 | 2.1 | 0.55 | | | | 22.4 | Separation Between Glass and Interlayer |

Table 3 provides examples for bending deflection measurements by the ring-on-ring test. In the specimen P-series, the laminated flat glass specimens, 300 mm×300 mm, were formed having a fixed 2.1 mm thickness for the first glass sheet and various thicknesses of the second glass sheet. Referential specimen P-ref and comparative example specimens P-1 and P-2 comprised the conventional PVB interlayer having a Young's modulus of about 0.1 to about 0.2 GPa. The example specimens P-3 and P-4 comprised a higher stiffness PVB (particularly, DG41 available from Eastman Chemical) having a Young's modulus of about 0.7 to about 1.2 GPa. The lamination processes were the same as those used for the example A, Y, and X series. A Universal Strength Testing Machine (Model 8871, INSTRON) was used for the ring-on-ring bending test. As described herein, a supporting ring with a diameter of 150 mm and a contact point radius of curvature of 2.5 mm and a loading ring with a diameter of 50 mm and a contact point radius of curvature of 2.5 mm were used. Values of "referential deflection" and "measured deflection" at an external load of 500 N (which was applied to the S1 (exterior) surface of the first glass sheet) were measured with a loading rate of 1 mm/min at 22.5 deg. C. and at the relative humidity level of 40%. "Normalized deflection" was calculated based on the referential and measured deflections. As shown in Table 3, the comparative examples P-1 and P-2 showed larger deflection (i.e., more easily deformable) than the reference P-ref. Such laminated glazing constructions may not be sufficiently stiff to pass the out-of-plane torque requirements (see Comparative example X-series in Table 1). However, example constructions P-3 and P-4 showed much smaller measured and normalized deflection values (deflected less under pressure). As shown in the example B-series in Table 2, these example constructions using the higher stiffness polymer for the stiff part 232 may provide enough rigid support for the out-of-plane torque.

Further, in Table 3, similar experiments were performed with samples having various thicknesses of the first glass, for specimen Q-series (first glass thickness 1.8 mm), R-series (first glass thickness 1.6 mm), S-series (first glass thickness 1.4 mm). Normalized deflections for all examples (Q-3, Q-4, R-2 and S-2) were less than 1 and the examples had higher stiffness compared with each respective reference specimen (Q-ref, R-red and S-ref).

Manufacturing Process

Figure 4:
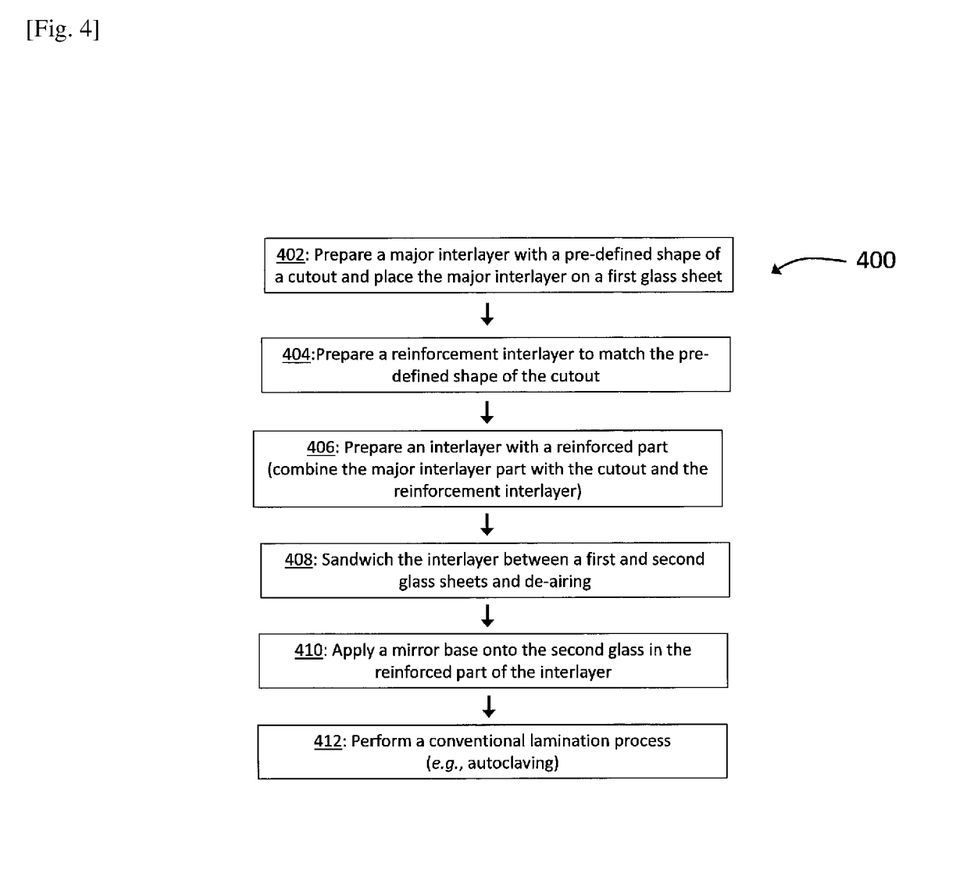
FIG. 4 illustrates an exemplary manufacturing process of a laminated vehicle glazing having an interlayer with a stiff part, according to an exemplary aspect of the present disclosure.

According to another aspect of the present disclosure, referring to FIG. 4, a process 400 for manufacturing a laminated vehicle glazing having an improved interlayer where a partial area near a mirror base is stiffer to improve mechanical robustness and strength may comprise the following steps.

Step 402 may include preparing a major polymer interlayer with a pre-defined cutout shape which may be replaced by a stiff part. The area of the pre-defined cutout shape may be larger than that of an attachment. Mechanical die-cuts or any other cutter including a laser cutter may be used to form the cutout. The major polymer interlayer may be placed on a first glass sheet.

Step 404 may include preparing a stiff interlayer to match the pre-defined shape of the cutout described in the step 402.

Step 406 may include preparing an interlayer with a stiff part by combining the major polymer interlayer (prepared in the step 402) and the stiff interlayer (prepared in the step 404). In particular embodiments, the major polymer interlayer may not overlap with the stiff interlayer. In further methods embodied herein, the stiff interlayer may be a non-sheet adhesive which may be applied within the cutout shape of the major polymer interlayer. In certain embodiments, the stiff interlayer may increase in stiffness upon curing, wherein the curing may include any suitable means, including ultraviolet radiation.

Step 408 may include sandwiching the interlayer (prepared in the step 406) between first and second glass sheets, and a generally-known de-airing process may be applied thereto. The first and second glass sheets may be prepared in advance in a preferred bent shape using a conventional bending process, such as gravity sag bending or press-bending. Optional opaque regions such as black or silver enamel printing may be provided on either of the S2, S3 or S4 surface(s) or combinations thereof, in a periphery of the laminated vehicle glazing or in the area near an attachment.

Step 410 may include application of an attachment on a pre-defined position of the second glass sheet over the stiff interlayer. In further embodiments, the attachment may be applied to the first glass sheet over the stiff interlayer.

Step 412 may include a conventional lamination process (e.g. autoclaving) well known in laminated vehicle glazings. In some embodiments, the attachment may be applied to the glazing after lamination.

TABLE 3

| Bending a Measurement | Laminated Glass Construction | | | Measured Deflection (mm) at 500 N | Normalized Deflection to the Referential Construction |
|---|---|---|---|---|---|
| | First Glass (Exterior) (mm) | Second Glass (Interior) (mm) | Interlayer Material | | |
| Reference P-ref | 2.1 | 2.1 | Conventional PVB | 0.557 | 1 |
| Comparative Example P-1 | 2.1 | 0.7 | Conventional PVB | 0.958 | 1.72 |
| Comparative Example P-2 | 2.1 | 0.55 | Conventional PVB | 0.966 | 1.73 |
| Example P-3 | 2.1 | 0.7 | High Stiffness PVB | 0.493 | 0.89 |
| Example P-4 | 2.1 | 0.55 | High Stiffness PVB | 0.502 | 0.90 |
| Reference Q-ref | 1.8 | 1.8 | Conventional PVB | 0.815 | 1 |
| Comparative Example Q-1 | 1.8 | 0.7 | Conventional PVB | 1.185 | 1.45 |
| Comparative Example Q-2 | 1.8 | 0.55 | Conventional PVB | 1.228 | 1.51 |
| Example Q-3 | 1.8 | 0.7 | High Stiffness PVB | 0.772 | 0.95 |
| Example Q-4 | 1.8 | 0.55 | High Stiffness PVB | 0.668 | 0.82 |
| Reference R-ref | 1.6 | 1.6 | Conventional PVB | 0.985 | 1 |
| Comparative Example R-1 | 1.6 | 0.55 | Conventional PVB | 1.418 | 1.44 |
| Example R-2 | 1.6 | 0.55 | High Stiffness PVB | 0.732 | 0.74 |
| Reference S-ref | 1.4 | 1.4 | Conventional PVB | 1.137 | 1 |
| Comparative Example S-1 | 1.4 | 0.55 | Conventional PVB | 1.531 | 1.55 |
| Example S-2 | 1.4 | 0.55 | High Stiffness PVB | 0.832 | 0.84 |

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure.

The invention claimed is:

1. A laminated vehicle glazing, comprising:
   a first glass sheet having a S1 surface facing a vehicle exterior and a S2 surface opposite the S1 surface;
   a second glass sheet having a S4 surface facing a vehicle interior and a S3 surface opposite the S4 surface; and
   an interlayer facing the S2 and S3 surfaces,
   wherein the interlayer is positioned between the first and second glass sheets,
   wherein the interlayer comprises a major part and a stiff part adjacent to the major part, wherein the major part is along at least one edge of the laminated vehicle glazing;
   wherein the major part comprises at least one layer of a first interlayer material, and the stiff part comprises at least one layer of a second interlayer material, wherein the second interlayer material has a higher Young's modulus than the first interlayer material; and
   wherein at least one of the first and second glass sheets has a thickness that is equal to or less than 2.0 mm,
   wherein the stiff part is in a direct contact with at least one of the first and second glass sheets,
   wherein the laminated vehicle glazing further comprises at least one attachment directly attached to the S4 surface of the laminated vehicle glazing, wherein the attachment is attached over the stiff part of the interlayer closer to a center of the stiff part than an edge of the stiff part and adheres to a surface of the laminated vehicle glazing.

2. The laminated vehicle glazing according to claim 1, wherein the attachment comprises an accessory or an attachment to be connected to an accessory.

3. The laminated vehicle glazing according to claim 2, wherein the accessory comprises a mirror base.

4. The laminated vehicle glazing according to claim 1, wherein an area of the stiff part facing the attachment is larger than an area by which the attachment is attached to the laminated vehicle glazing.

5. The laminated vehicle glazing according to claim 1, wherein the first interlayer material comprises polyvinyl butyral (PVB).

6. The laminated vehicle glazing according to claim 1, wherein the first and second glass sheets comprise soda-lime glass without chemical strengthening.

7. The laminated vehicle glazing according to claim 1, wherein the thickness of the second glass sheet is equal to or less than about 1.6 mm.

8. The laminated vehicle glazing according to claim 7, wherein the thickness of the second glass sheet is equal to or less than about 1.1 mm.

9. The laminated vehicle glazing according to claim 1, wherein the second interlayer material comprises PVB.

10. The laminated vehicle glazing according to claim 1, wherein the Young's modulus of the second interlayer material is equal to or greater than about 0.6 GPa.

11. The laminated vehicle glazing according to claim 10, wherein the Young's modulus of the second interlayer material is equal to or greater than 20 GPa.

12. The laminated vehicle glazing according to claim 1, wherein the interlayer comprises a first peripheral edge opposed to a second peripheral edge, wherein the first and second peripheral edges are connected by a center region, and wherein the stiff part is positioned in the center region, such that the stiff part is closer to the first peripheral edge than the second peripheral edge.

13. The laminated vehicle glazing according to claim 1, wherein the stiff part is surrounded by the major part.

14. The laminated vehicle glazing according to claim 1, wherein the attachment and the laminated vehicle glazing pass an out-of-plane torque test at least 30 N·m.

15. The laminated vehicle glazing according to claim 1, wherein the stiff part is in a direct contact with both of the first and second glass sheets.

16. The laminated vehicle glazing according to claim 1, wherein the stiff part adheres to at least one of the first and second glass sheets.

17. The laminated vehicle glazing according to claim 1, wherein the stiff part adheres to both of the first and second glass sheets.

18. A laminated vehicle glazing, comprising:
   a first glass sheet having a S1 surface facing a vehicle exterior and a S2 surface opposite the S1 surface;
   a second glass sheet having a S4 surface facing a vehicle interior and a S3 surface opposite the S4 surface; and
   an interlayer facing the S2 and S3 surfaces,
   wherein the interlayer is positioned between the first and second glass sheets,
   wherein the interlayer comprises a major part and a stiff part adjacent to the major part, wherein the major part is along at least one edge of the laminated vehicle glazing,
   wherein the major part comprises at least one layer of a first interlayer material, and the stiff part comprises at least one layer of a second interlayer material, wherein the second interlayer material has a higher Young's modulus than the first interlayer material,
   wherein at least one of the first and second glass sheets has a thickness that is equal to or less than 2.0 mm,
   wherein the second interlayer material comprises a carbon fiber reinforced plastic (CFRP) interlayer, and
   wherein the laminated vehicle glazing further comprises at least one attachment attached to the laminated vehicle glazing, wherein the attachment is attached over the stiff part of the interlayer closer to a center of the stiff part than an edge of the stiff part.

* * * * *